United States Patent [19]
Susel

[11] Patent Number: 6,111,527
[45] Date of Patent: Aug. 29, 2000

[54] EXPANDABLE KEYBOARD

[76] Inventor: Irving Susel, 7708 Zulima Ct., Bethesda, Md.

[21] Appl. No.: 09/099,354

[22] Filed: Jun. 18, 1998

[51] Int. Cl.$^7$ .................................................. H03M 11/00
[52] U.S. Cl. .............................. 341/22; 341/20; 345/168; 400/473; 361/680
[58] Field of Search ........................ 341/20, 22; 345/168; 361/680; 400/472, 473

[56] References Cited

U.S. PATENT DOCUMENTS

| | | | |
|---|---|---|---|
| 3,940,758 | 2/1976 | Margolin | 340/337 |
| 5,187,644 | 2/1993 | Crisan | 361/393 |
| 5,267,127 | 11/1993 | Pollitt | 361/680 |
| 5,502,460 | 3/1996 | Bowan | 345/168 |
| 5,543,787 | 8/1996 | Karidis et al. | 341/20 |
| 5,635,928 | 6/1997 | Takagi et al. | 341/22 |
| 5,644,338 | 7/1997 | Bowen | 345/168 |
| 5,659,307 | 8/1997 | Karidis et al. | 341/22 |
| 5,682,138 | 10/1997 | Powell et al. | 340/475 |
| 5,687,058 | 11/1997 | Roylance | 361/680 |
| 5,706,167 | 1/1998 | Lee | 361/680 |
| 5,717,431 | 2/1998 | Chia-Ying et al. | 345/168 |

*Primary Examiner*—Michael Horabik
*Assistant Examiner*—Albert K. Wong
*Attorney, Agent, or Firm*—Burns, Doane, Swecker & Mathis, L.L.P.

[57] ABSTRACT

A keyboard assembly for handheld and subnotebook computers that offers the functionality and comfort of a full-size keyboard and increases the effective screen display area without affecting the footprint of the closed computer. The keyboard assembly includes two keyboard areas, a primary keyboard which slides apart at the center to reveal an auxiliary keyboard area beneath. The primary keyboard is located on two movable pallets that slide in opposite directions, and which includes sufficient QWERTY and control keys to allow the handheld computer to be operated for most uses without accessing the auxiliary keyboard area. The auxiliary keyboard area becomes exposed when the keyboard pallets are moved apart to the extended position. The auxiliary keyboard area contains keys that in conjunction with the primary keyboard provide the functionality of a full keyboard, and can also increase the effective screen area by containing menu keys and status bars that would normally be accessed by touch sensitive displays. Further, by allocating keys and functions form the primary area to the auxiliary area, the keys for the primary keyboard can be full size, allowing normal touch typing even for the smallest computers.

20 Claims, 4 Drawing Sheets

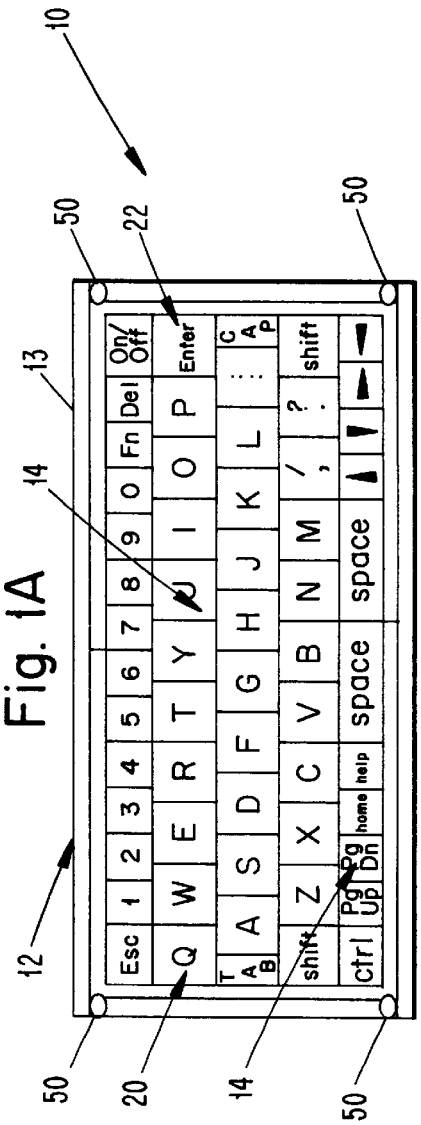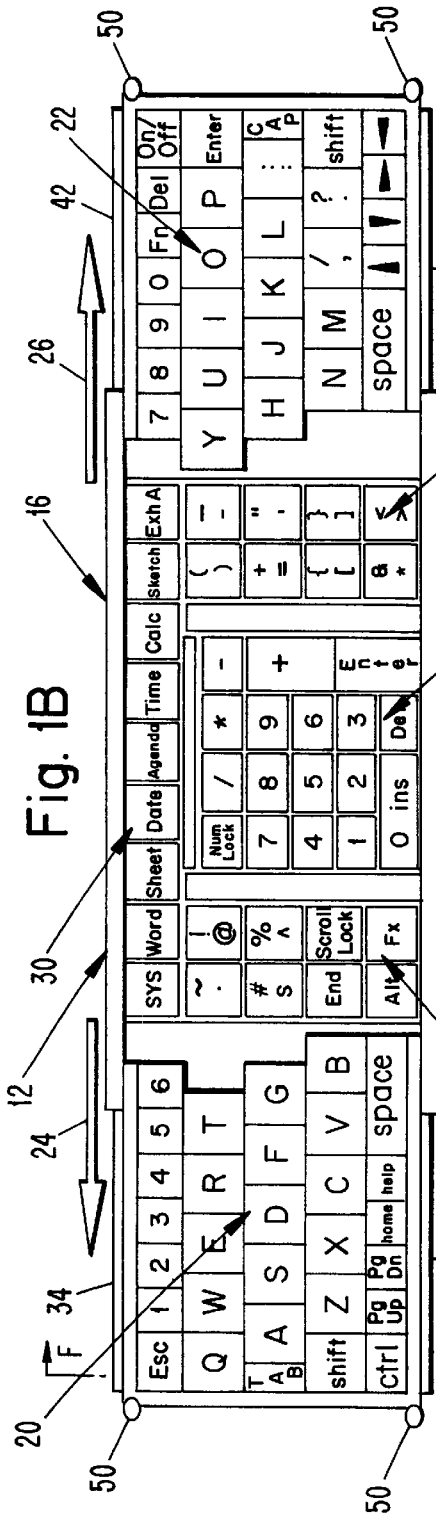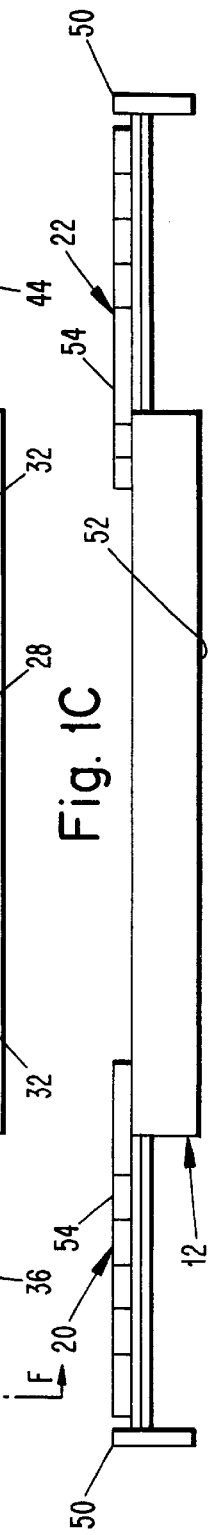

EXPANDABLE KEYBOARD

FIELD OF THE INVENTION

The present invention relates to a keyboard assembly for computers. More particularly, the present invention relates to a keyboard assembly for handheld and subnotebook computers that offers the functionality and comfort of a full-size keyboard without affecting the footprint of the closed computer.

BACKGROUND OF THE INVENTION

In recent years, the size of portable computers have significantly decreased in size from the original laptop design, to the handheld and subnotebook computers. Handheld computers and subnotebook computers are smaller computers with a laptop type configuration. As the size of these computers have been reduced, the keyboards have as well been reduced in size.

Even though handheld and subnotebook computers that use keyboards are small (e.g. about 3.5"×7"×1" for handheld, and about 4.5"×8"×1.5" for subnotebook computers), they provide essentially the same functionality of larger laptop computers. For instance, handheld and subnotebook computers run productivity software including word processors, spreadsheets, fax, e-mail, etc. Because of the rapid advancement of computer technology, the capabilities of these smaller computers are constantly increasing. However, there are problems associated with these smaller computers that have been hindering their effectiveness in spite of increasing processing power and an expanding selection of productivity software.

First, regardless of the capability of the hardware and the availability of software for these small computers, their functionality are constrained because they have keyboards that are too small to use effectively and comfortably. In order to use the available productivity software, full keyboard function is essential. Therefore, manufacturers have been attempting to cram full physical keyboards into the footprint area of these small computers. Typically, this means that the keys are small, closely spaced, and some single-key functions are accessed through complex key combinations. Resulting layouts are packed with too many keys that are too cramped to allow adequate keyboard input. Not only are these keyboards tedious to use, they are a bottleneck posing a significant barrier to attaining the potential functionality for handhelds and subnotebooks that manufacturers are trying to provide and that consumers want.

Small screen displays are another constraint on the functionality of subnotebook and especially handheld computers. The effective screen area for these computers is even smaller due to the need to accommodate menu and status bars, which can use up ¼ to ⅓ of the display area. If this screen "overhead" could be relocated, the effective screen area would increase, significantly improving the functionality of these small computers.

As miniaturization and processors improve, ease of input and effective display area will be increasingly critical factors constraining the use and functionality of handheld and subnotebook computers.

There have been varying efforts to address these problems. For instance, U.S. Pat. No. 5,687,058 to Roylance discloses an apparatus for reducing the dimensions of a computer keyboard for transportation and storage. In its operative position, the keyboard extends beyond the footprint of the computer. In its closed position, the extended keyboard portions are folded such that keyboard sections are vertically adjacent to each other. However, because keyboard sections are placed on top of one another, the thickness of the computer is increased, resulting in a bulkier design. In addition, the keyboard and thereby the computer, are not functional until it is unfolded.

U.S. Pat. No. 5,187,644 to Crisan discloses a compact portable computer having an expandable full size keyboard with extendable supports. The computer includes a housing having a pair of opposing housing compartments therein. The housing compartments are connected by a hinge for permitting selective pivotal rotation of the housing compartments for exposing a pair of inner surfaces corresponding to each compartment. The lower inner surface includes a keyboard having at least one hingedly extendable flap containing a portion of the keyboard. In order to operate the keyboard, the flap must be pivoted away from the inner surface of the lower compartment in order to reveal the remaining keyboard portions. However, there are two major disadvantages to this design. First, the overall thickness of the computer is increased, because the flap must be pivoted on top of the keyboard of the lower compartment for transportation and storage. Second, the keyboard does not become functional until the flaps are pivoted off the main keyboard section.

U.S. Pat. No. 5,267,127 to Pollitt discloses a personal computer with folding and sliding keyboard sections. The keyboard sections are coupled together for pivotal movement about a keyboard axis so that in its opened, operative position, the keyboard overlays the housing of the computer, to a closed position, where the keyboard sections are pivoted about the keyboard axis, whereby the sections of the keyboard are wholly within the outline configuration of the enclosure. While the overall thickness of the computer is not increased, the keyboards are not functional until the sections are properly rotated. In addition, because the sections must ultimately fit within the footprint of the computer, the overall size of the computer is not greatly reduced. Thus, Pollitt is not feasible for smaller handheld or subnotebook computers.

U.S. Pat. No. 5,543,787 to Karidis et al. discloses a keyboard with translating sections. The pallets are movable relative to each other between a compact stowing position and an extended operational position. Upon moving the cover from the open position to the closed position, the pallets are automatically moved from the extended operational position to the compact stowing position. Like Pollitt, because the keyboard sections must fit within the footprint of the computer, the overall size of the computer cannot be greatly reduced. Thus, Karidis is not feasible for handheld computers.

U.S. Pat. No. 5,706,167 to Lee discloses a portable notebook computer having an ergonomically designed keyboard made up of two rotatably separable keyboard sections. The keyboard sections may be manually rotated apart to a desired angle. As the user closes the lid, the sections are automatically driven together. While the feel of the keyboard is somewhat improved, the overall size of the computer is not greatly improved because the keyboard sections must fit within the footprint of the computer.

U.S. Pat. No. 5,644,338 to Bowen discloses an ergonomic laptop computer and ergonomic keyboard. The keyboard is to be used on an operator's lap and separates to relieve stress in an operator's neck and wrists. The keyboard has a flat surface between the keyboard sides, so while being held on a person's lap, will hold reference material and a pointing device that can be used with either hand to keep the neck straight. However, Bowen has no provision for additional keys, nor does Bowen consider relocating any of the QWERTY keys to the flat surface.

Accordingly, there is a need in the art for a keyboard assembly for handheld and subnotebook computers, which provides the effectiveness and comfort of a full-size keyboard without significantly affecting the size or weight of the computer. In addition, there is a need in the art for an expandable display area for subnotebook and handheld computers, which effectively relocates menu bars and status bars to an auxiliary location.

SUMMARY OF THE INVENTION

Generally speaking, this invention fulfills the above-described needs in the art by providing an electronic keyboard for use with a computer comprising a lower housing compartment. A primary keyboard is disposed in operative relation to the lower housing compartment and includes first and second slidably movable pallets. Each pallet is movable between a first closed position and a second extended position. The electronic keyboard also includes an auxiliary keyboard portion having discrete key portions disposed beneath the first and second keyboard pallets. The auxiliary keyboard portion becomes exposed when the first and second keyboard pallets are moved to the second extended position.

BRIEF DESCRIPTION OF THE DRAWINGS

For a complete understanding of the nature and desired objects of this invention, reference should be made to the following detailed description taken in connection with the accompanying drawings, wherein like reference numbers refer to corresponding items throughout the several illustrations of the preferred embodiments of the present invention and wherein:

FIG. 1A is a plan view of the preferred embodiment of the keyboard assembly of the present invention, with a movable left pallet and a movable right pallet;

FIG. 1B is a plan view of the preferred embodiment of the keyboard assembly, illustrating the left and right pallets in their fully extended positions;

FIG. 1C is a side elevational view of the keyboard assembly of the preferred embodiment;

DETAILED DESCRIPTION OF THE PREFERRED EMBODIMENT

Figure 1D:
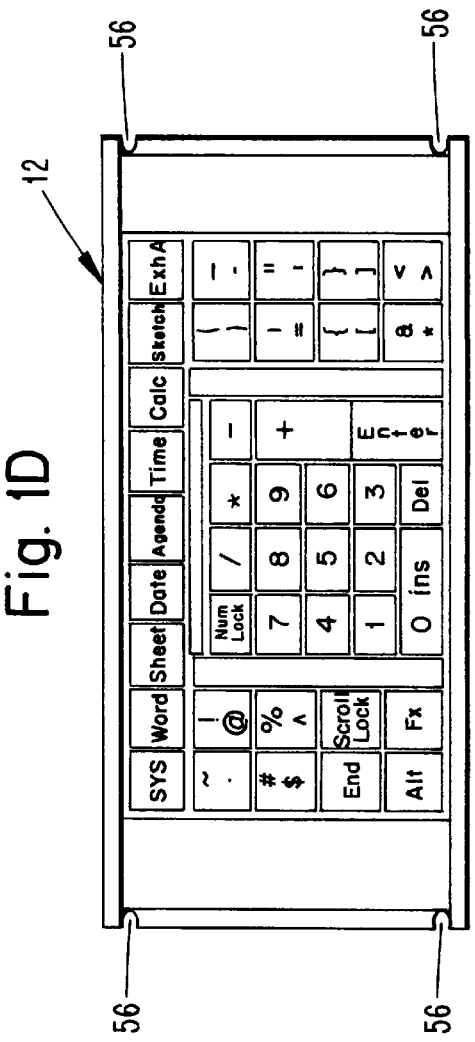
FIG. 1D is a plan view of the auxiliary keypad of the preferred embodiment, illustrated without the left and right pallets.

Referring now to the drawings, FIG. 1 illustrates the keyboard assembly 10 to be used in a portable computer. It will be appreciated by those of skill in the art that the keyboard assembly 10 of this invention may be used in conjunction with any type of computer. However, the invention is described below in a preferred embodiment in which it is used with a handheld or subnotebook computer.

With reference to FIGS. 1A–1F, keyboard assembly 10 is adapted for use in a handheld or subnotebook computer (not shown) and is disposed in a lower compartment 12 of the computer. The computer includes an upper housing compartment (not shown), normally incorporating a display device which is hingeably connected to lower compartment 12 at its top surface 13. Typically, the computer also includes the standard corresponding electronic circuitry which is contained in lower housing compartment 12. Keyboard assembly 10 could also be used in other types of electronic devices and, as a stand-alone or removable keyboard assembly.

The keyboard assembly 10 is comprised of a primary keyboard 14 and an auxiliary keyboard 16. The primary keyboard 14 is the keyboard that is exposed when the computer is initially opened, as illustrated specifically with reference to FIG. 1A. It preferably contains the minimum number of keys required for standard computer uses, such as the QWERTY keys, essential control keys such as "ON/OFF" key, "ALT" key, "CTRL" key, and "ESC" key, and other basic word processing function keys such as the space bar, "ENTER" key, "TAB" key, "SHIFT" key, etc. QWERTY keys are hereinafter defined as the standard key layout of the alphabet having a staggered arrangement of keys. The keys in the first row are "ZXCVBNM,./", the second row are "ASDFGHJKL;'", and the third row are "QWERTYUIOP[]".

FIG. 1A illustrates a sample selection of keys to be placed on the primary keyboard 14. In that figure, primary keyboard 14 includes five horizontal rows of keys. The middle three rows of keys contain the standard QWERTY keys, and also including "TAB" key, "SHIFT" key, "CTRL" key, "ENTER" key, and CAP" key, whose upper typing surface areas are preferably slightly larger than the remaining two rows of keys. The top row of keys include the "ESC" key, "1234567890" keys, "FN" key, "Del" key, and "On/Off" key. The bottom row of keys include the "CTRL" key, "Pg Up" and "Pg Dn" key, "HOME" key, "HELP" key, the space bar, and control arrows. The keys contained on primary keyboard 14 are sized to have the feel of a full-size keyboard. That is, they contain standard touch typing keys, similar to keys contained on, for example, a standard IBM AT keyboard.

The keys on primary keyboard 14 extend to a key height 54 which can vary depending on the design considerations for the specific computer. It should be understood that there may be more or less than five horizontal rows of keys as well as more or less keys per row, depending on the desired functionality and target key size of the primary keyboard 14. Accordingly, the keys on primary keyboard 14 may be sized and spaced according to preference.

Primary keyboard 14 includes two slidably movable keyboard pallets 20 and 22. It should be understood that "pallet" refers to a group of two or more keys that can be moved together. As described above, each pallet 20 and 22 is comprised of alphanumeric characters for basic word processing abilities and is translatable between a closed position as illustrated in FIG. 1A, to an open position as illustrated in FIG. 1B. With reference to FIG. 1B, left pallet 20 is slidably movable to its open position in the direction of arrow 24. Likewise, right pallet 22 is slidably movable to its open position in the direction of arrow 26. Preferably, pallets 20 and 22 are slidably movable in the same plane.

Preferably, left pallet 20 is split such that the "T" key, "G" key, "B" key, "6" key, and part of the space bar border right pallet 22. The keys left of the left pallet border keys are in the same relative position as a standard keyboard. Likewise, right pallet 22 is complimentary to left pallet 20. The border keys on the right pallet 22 include the "Y" key, "H" key, "N" key, "7" key and the other half of the space bar. The keys right of the right border keys are in the same relative position as a standard keyboard. Preferably, left pallet 20 includes 15–45 keys, while right pallet 22 includes 15–45 keys. It should be understood that pallets 20 and 22 can be designed to contain various grouping of keys split along different locations, as long as basic computer capabilities are maintained. However, in cases where an even more compact keyboard is desired, stand-alone functionality for the primary keyboard can be reduced as needed, in order to achieve the desired key size and spacing.

For more intensive keyboard requirements than can not be met by the basic keys contained on primary keyboard 14, pallets 20 and 22 can be pulled apart, revealing auxiliary keyboard 16 disposed beneath primary keyboard 14. Preferably, pallets 20 and 22 can be separated as much as the width of primary keyboard 14, revealing auxiliary keyboard 16 having discrete key portions. Auxiliary keyboard 16 is housed in a top portion of lower compartment 12. Auxiliary keyboard 16 includes 10–60 key portions, and preferably from 20–50 key portions. In certain embodiments, the auxiliary keyboard 16 has at least as many discrete key portions as either pallet 20 or pallet 22. In still further embodiments, the surface area of the auxiliary keyboard 16 is from about 75% to 200% of the surface area of each pallet 20 or 22, and more preferably the auxiliary keyboard 16 has a surface area from about 90%–150% of each of the primary keyboard pallets 20 and 22.

With reference to FIG. 1B, auxiliary keyboard 16 includes keys not contained on primary keyboard 14, but which are necessary for full keyboard functionality. Auxiliary keyboard 16 could be comprised of touch typing keys or a pressure-sensitive keypad, or both. A pressure sensitive keypad is defined as a keypad having discrete key portions which is substantially planar with the upper surface of the lower housing compartment 12, whose typing surfaces must be compressed in order to operate the keys. These keys are similar to keys of a membrane keyboard. A membrane keyboard is constructed of two thin plastic membranes that contain flexible printed circuits. The top membrane is the printed keyboard and a spacer sheet with holes in the middle. When a user presses a key, the top membrane is pushed through the spacer hole and makes contact wit the bottom membrane, completing the circuit. Such pressure sensitive keys are commonly used as control panels for appliances, such as microwaves. Using a pressure or touch sensitive keypad minimizes the thickness of auxiliary keyboard 16. Together, primary keyboard 14 and auxiliary keyboard 16 provide for functionality comparable to that of a full-size keyboard.

In addition, auxiliary keyboard 16 can include pressure-sensitive keys which effectively relocate screen functions typically located on the border of the screen display, such as in the Psion Series 5 computer, or as part of a touch sensitive display, for example as contained on the HP 600 Series computers. Similarly, screen overhead such as menu and status bars could be relocated to a touch sensitive display on auxiliary keyboard 16. The auxiliary keyboard 16 can contain all or part of the screen functions contained on the screen display, through use of a pressure sensitive keypad, touch sensitive screen, or both.

FIG. 1B illustrates a sample selection of keys to be placed on the auxiliary keyboard 16. In that figure, auxiliary keyboard 16 includes a number keypad 28, screen border 20 functions 30, and other miscellaneous keys 32 in the form of a keypad, relocated from primary keyboard 14. Number keypad 28 and miscellaneous keypad 32 are planar, pressure-sensitive keys, which are constructed into lower housing compartment 12. Because the keys are planar, the additional thickness of the computer needed to accommodate auxiliary keyboard 16 is minimized. Screen border functions 30 includes optional features relocated from the screen display, and may either be a touch sensitive keypad or a touch sensitive screen.

Alternatively, the auxiliary keyboard 16 could be comprised in part or in its entirety of touch typing keys, as are found on primary keyboard 14. The touch typing keys are preferably designed to allow the upper surface of the keys on auxiliary keyboard 16 to be at substantially the same level as key height 54 on primary keyboard 14. However, it should be understood that there are numerous detailed design choices regarding the keys that are placed on the primary keyboard 14 versus those that are placed on the auxiliary keyboard 16, and the above-described invention is not limited to the keys shown in FIG. 1A and 1B. In addition, there are innumerable selection of key size, spacing, position and type of key.

Figure 1E:
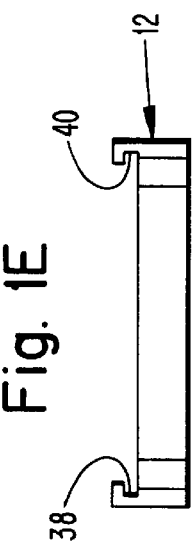
FIG. 1E is a cross sectional view of the lower compartment taken along line E—E of FIG. 1B.
Figure 1F:
FIG. 1F is a cross sectional view of the left pallet of the primary keyboard taken along line F—F of FIG. 1B.

In order to move left pallet 20 relative to lower compartment 12, pallet 20 preferably includes a pair of rails 34 and 36 along its top and bottom surfaces, as shown with specific reference to FIG. 1B and 1F. Rails 34 and 36 are designed to interface with and fit into complimentary slots 38 and 40 along top and bottom surfaces of lower compartment 12, as shown with reference to FIG. 1B, 1E and 1F. Likewise, right pallet 22 includes a pair of rails 42 and 44 along its top and bottom surfaces. Rails 42 and 44 are designed to interface with and fit into complimentary slots 38 and 40 contained on lower compartment 12. The rails 34, 36, 42, and 44 and complimentary slots 38 and 40 are conductive and provide for the proper electrical connection for primary keyboard 14. Alternatively, pallets 20 and 22 may contain slots in operative relation to corresponding rails contained in the lower compartment 12. However, it should be understood that alternative structures may be contemplated that can be used to deploy primary keyboard 14, and are included within the scope of this invention.

In addition, primary keyboard 14 preferably includes a plurality of legs 50 which are disposed at corresponding corners of keyboard 14 for supporting keyboard 14 in its deployed position. With reference to FIG. 1C, legs 50 preferably extend from the bottom surface 52 of lower compartment 12 upward to key height 54. In this manner, legs 50 provide a structure by which the pallets 20 and 22 may be grasped and subsequently deployed, in addition to providing support for the deployed keyboard. With reference to FIG. 1D, lower compartment 12 includes complimentary notches 56 disposed at each corner of lower compartment 12. Notches 56 allow respective legs 50 to be nestled inside notches 56 when pallets 20 and 22 are in their closed, adjacent position. However, it should be understood that alternative structures may be contemplated for supporting the deployed keyboard including a single leg or a vertical panel for each pallet, with respective notches.

Figure 2:
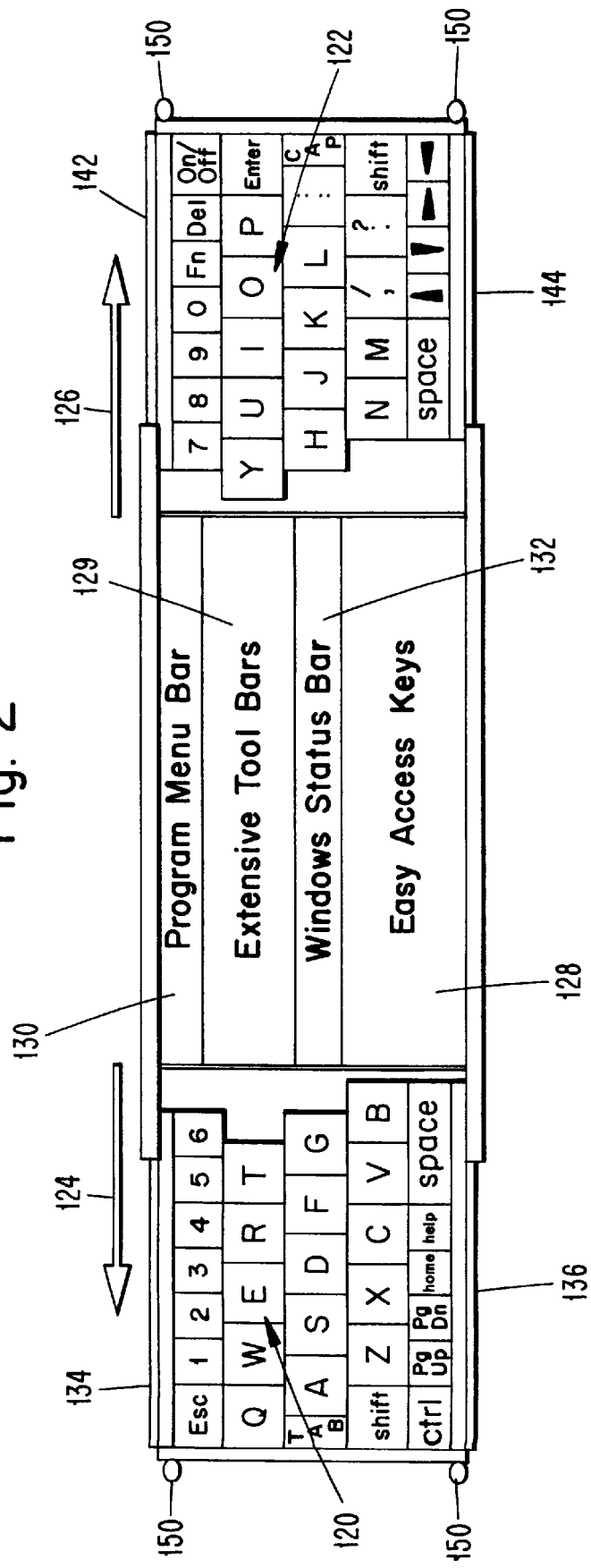
FIG. 2 is a plan view of a first alternative embodiment of the present invention, in which the auxiliary keyboard is reconfigurable.

With reference now to FIG. 2, a first alternative embodiment will be described. Structurally, keyboard assembly 110 of the first alternative embodiment is substantially identical to the keyboard assembly 10 of the preferred embodiment, and includes features described above. Keyboard assembly 110 is disposed in a lower compartment 112, and includes movable pallets 120 and 122. An auxiliary keyboard 116 is disposed beneath the primary keyboard 114, and is comprised substantially or entirely of a touch-sensitive display.

Left pallet 120 and right pallet 122 are split in a manner similar to that of primary keyboard 14 of the preferred embodiment. However, it should also be understood that pallets 120 and 122 can be designed to contain various grouping of keys split along different locations, as for the preferred embodiment.

In certain embodiments, the auxiliary keyboard 116 has at least as many discrete key portions as either pallet 120 or pallet 122. In still further embodiments, the surface area of the auxiliary keyboard 116 is from about 75% to 200% of the surface area of the one of pallets 120 or 122, and more preferably the auxiliary keyboard 116 has a surface area from about 90%–150% of each of the primary keyboard pallets 120 and 122.

Likewise, pallet 120 includes a pair of rails 134 and 136 along its top and bottom surfaces, substantially similar to the structure and function of rails 34 and 36 of the preferred embodiment. Pallet 122 includes a pair of rails 142 and 144 along its top and bottom surfaces, substantially similar to the structure and function of rails 42 and 44 of the preferred embodiment. Rails 134, 136, 142, and 144 are designed to interface with and fit into complimentary slots (not shown) contained on lower compartment 112 in the substantially the same manner as the preferred embodiment. However, it should be understood that alternative structures may be contemplated, as described in the preferred embodiment.

In addition, primary keyboard 14 preferably includes a plurality of legs 150 which are disposed at the corners of keyboard 114, and are substantially similar to legs 50 of the preferred embodiment and include features as described above. Lower compartment 112 includes a plurality of complimentary notches (not shown) which are substantially identical to and includes features of notches 56 of the preferred embodiment. However, it should be understood that alternative structures may be contemplated, as described in the preferred embodiment.

The touch-sensitive screen portion of the display is programmable to automatically reconfigure, depending on the application in use. For example, a number pad would automatically be included in the configuration when a spreadsheet is used, but not when a word processor is used. FIG. 2 illustrates a sample allocation of the auxiliary keyboard 116 for use with a word-processing program. In that figure, auxiliary keyboard 116 includes easy access keys 128, extensive user-defined toolbars 129, and information that would normally take up space on the display screen of the computer, such as the program menu bar 130 and windows status bar 132. In addition, the computer is programmable to sense when the primary keyboard 114 is closed so that the screen functions on the auxiliary keyboard 116 would appear on the display screen of the upper housing compartment. In addition, the computer is programmable to reconfigure the auxiliary keyboard 116 upon command by a user. Thus, the user can control what key functions or screen borders would be located on the auxiliary keyboard 116. For example, the user could cause a number pad pop up even when using a word processing program. In this example, the areas comprising the program menu bar 130, the extensive tool bars 129, and the windows status bar 132, is comprised of a single touch sensitive display, while the easy access keys 128 could either be part of the touch sensitive display or could be a separate pressure sensitive keypad.

Figure 3A:
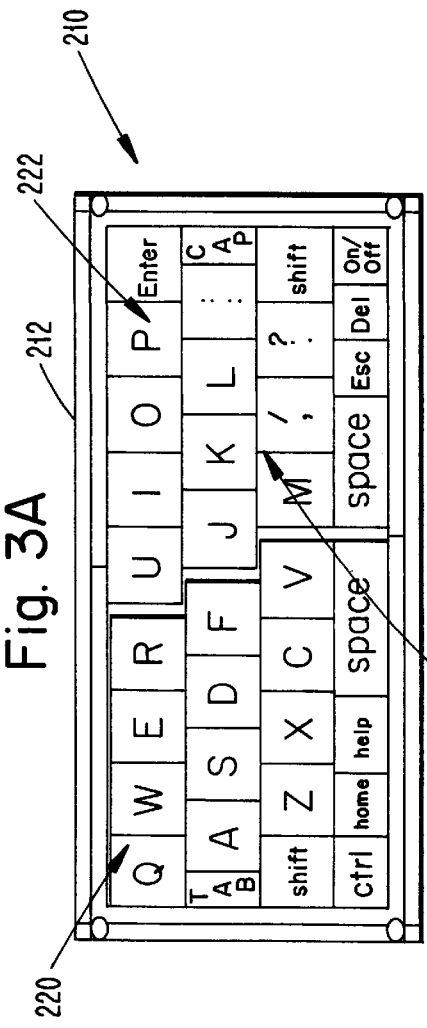
FIG. 3A is a plan view of a second alternative embodiment of the present invention, in which some QWERTY keys have been relocated from the primary keyboard to the auxiliary keyboard.
Figure 3B:
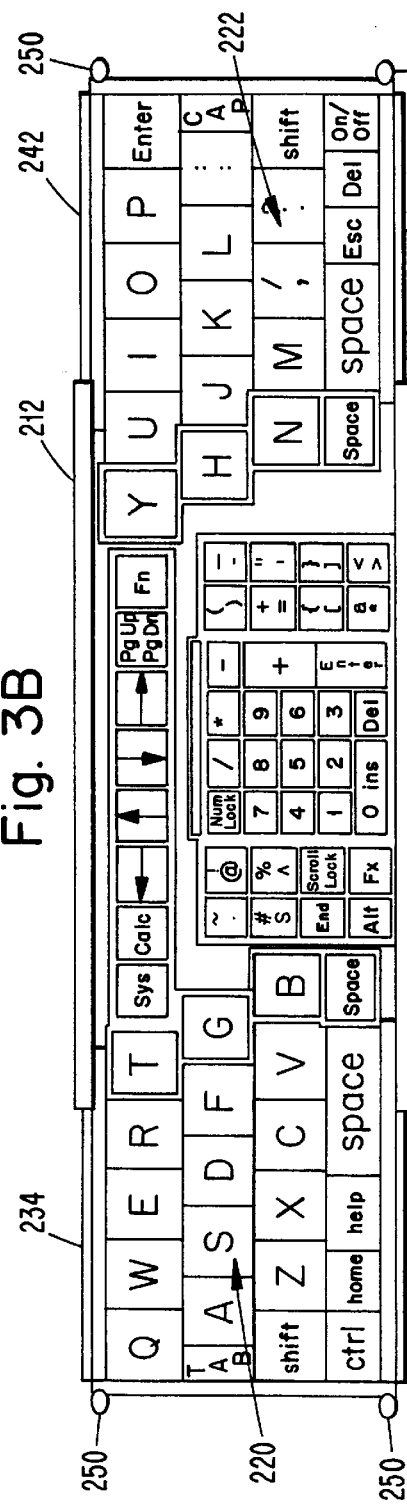
FIG. 3B is a plan view of the second alternative embodiment, illustrating the left and right pallets in their fully extended positions.
Figure 3C:
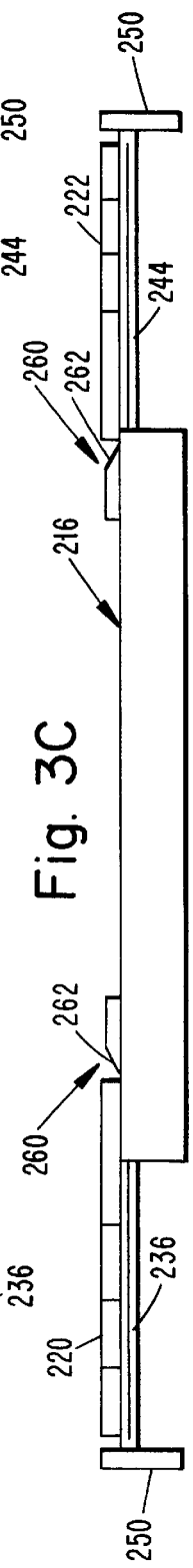
FIG. 3C is a side view of the second alternative embodiment of the keyboard assembly.

With reference to FIGS. 3A–3C, a second alternative embodiment will be described in more detail. Structurally, keyboard assembly 210 is similar to keyboard assembly 10 of the preferred embodiment, and includes features of keyboard assembly 10 as described above. Keyboard assembly 210 includes a primary keyboard 214 and an auxiliary keyboard 216 disposed beneath the primary keyboard 214. Primary keyboard 214 is disposed in lower compartment 212.

Primary keyboard 214 includes movable pallets 220 and 222. Left pallet 220 includes rails 234 and 236 which interface with slots (not shown) contained in lower compartment 212, in the substantially the same manner as described in the preferred embodiment. Likewise, right pallet 222 includes rails 240 and 242 which interface with slots (not shown) contained in lower compartment 212, in substantially the same manner as described in the preferred embodiment. It should also be understood that alternative structures may be contemplated that can be used to deploy primary keyboard 214, and are included within the scope of this invention.

In addition, primary keyboard 214 includes a plurality of legs 250 which are disposed at the corners of the keyboard 214 for supporting keyboard 214 in its deployed position, and are substantially similar in structure to legs 50 of the preferred embodiment and include the features of legs 50 as described above. Lower compartment 212 includes complimentary notches (not shown) which allow respective legs 250 to be nestled within. It should also be understood that alternative structures may be contemplated for supporting the deployed keyboard, as described in the preferred embodiment.

In this embodiment, there are preferably four horizontal rows of keys on primary keyboard 214. However, there may be more or less than four horizontal rows, according to design preference. The top three rows include the standard QWERTY keys, except that the bordering keys described in left pallet 20 and right pallet 22 of the preferred embodiment are relocated from primary keyboard 214 to auxiliary keyboard 216. That is, two columns of QWERTY keys ("T", "G", "B" and "Y" "H","N") are relocated to the auxiliary keyboard 216. While this reduces the stand-alone functionality of the primary keyboard 214, keyboard assembly 210 can achieve full-size keys and key-spacing for even smaller handheld computers. It should be understood that the selection and layout of keys on primary keyboard 214 and auxiliary keyboard 216 may vary according to design preference.

When the primary keyboard 214 is deployed, the relocated QWERTY keys should be designed to present themselves on auxiliary keyboard 216 at locations that promote touchtyping. Preferably, the "T", "G" and "B" keys, and the "Y", "H" and "N" keys, are standard touch typing keys as shown in FIG. 3B and 3C, and have a sufficient height to present their surfaces at the same level as the primary keyboard 214. Accordingly, the outside edges 262 of the relocated QWERTY keys 260 are sloped to allow the primary keyboard 214 to depress these keys when in the closed position, minimizing the extra thickness that would be added to the computer. It should also be understood that relocated QWERTY keys may also be in the form of a planar keypad. While the ability for touch-typing is somewhat reduced when using a planar keypad, it is not significant when compared to the improved ability to touch-type with the keys on primary keyboard 14.

Additional QWERTY keys can be relocated to auxiliary keyboard 216, such as the "R", "F", and "V" keys and "U", "J", and "M" keys. This concept could be further extended to allow full-size or near full-size keyboard spacing for even the smallest computers.

Together, the improved keyboard functionality and the increased effective display area provide a significant increase in the functionality of handheld and subnotebook computers, thereby reducing the constraints resulting from their small keyboard and display size.

Once given the above disclosure, many other features, modifications, and improvements will become apparent to the skilled artisan. Such other features, modifications, and improvements are therefore considered to be a part of this invention, the scope of which is to be determined by the following claims.

I claim:

1. An electronic keyboard assembly for use on computer, comprising:
    a lower housing compartment;
    a primary keyboard disposed in operative relation to said lower housing compartment and including first and second slidably movable pallets, each said pallet is movable between a first closed position and a second extended position; and
    an auxiliary keyboard having discrete key portions, said auxiliary keyboard disposed beneath said first and second keyboard pallets and accessible when said first and second keyboard pallets are in said second extended position.

2. The keyboard assembly of claim 1, wherein said keyboard is used in a handheld or subnotebook computer.

3. The keyboard assembly of claim 1, wherein said pallets are movable in a first plane.

4. The keyboard assembly of claim 1, wherein said auxiliary keyboard is a pressure sensitive keypad.

5. The keyboard assembly of claim 1, wherein said auxiliary keyboard includes touch typing keys with a height substantially equal to a height of keys of said primary keyboard.

6. The keyboard assembly of claim 1, wherein said auxiliary keyboard is a reconfigurable touch sensitive screen.

7. The keyboard assembly of claim 1, wherein said auxiliary keyboard is a combination of touch typing keys, touch sensitive keypad, and a touch sensitive screen.

8. The keyboard assembly of claim 1, wherein said first pallet includes first and second rails which are operably associated with and interface with first and second slots contained in said lower housing compartment and said second pallet includes third and fourth rails which are operably associated with and interface with said first and second slots contained in said lower housing compartment.

9. The keyboard assembly of claim 8, wherein said rails and slots are conductive.

10. The keyboard assembly of claim 1, wherein said first pallet includes first and second slots which are operably associated with and interface with first and second rails contained in said lower housing compartment and said second pallet includes third and fourth slots which are operably associated with and interface with said first and second rails contained in said lower housing compartment.

11. The keyboard assembly of claim 10, wherein said rails and slots are conductive.

12. The keyboard assembly of claim 1, wherein said primary keyboard includes the standard QWERTY keys for basic word processing.

13. The keyboard assembly of claim 12, wherein QWERTY keys are relocated from said primary keyboard to said auxiliary keyboard for facilitating touch typing.

14. The keyboard assembly of claim 13, wherein outside edges of said relocated QWERTY keys adjacent said first and second keyboard pallets are sloped.

15. The keyboard assembly of claim 1, wherein a plurality of legs are disposed at corresponding corners of said primary keyboard, said legs extending from a base of said lower compartment to a height of keys of said primary keyboard.

16. The keyboard assembly of claim 15, wherein said lower compartment includes a plurality of notches at corresponding corners of said lower compartment for housing said legs when said first and second pallets are in said first closed position.

17. The keyboard assembly of claim 1, wherein said left and right pallets each include between 15 to 45 keys.

18. The keyboard assembly of claim 17, wherein said auxiliary keyboard includes between 10 to 60 key portions.

19. The keyboard assembly of claim 1, wherein a surface area of said auxiliary keyboard is from about 75% to 200% of a surface area of each said pallet.

20. The keyboard assembly of claim 1, wherein a surface area of said auxiliary keyboard is from about 90% to 150% of a surface area of each said pallet.

* * * * *